(12) United States Patent
Couzy et al.

(10) Patent No.: US 6,471,999 B2
(45) Date of Patent: Oct. 29, 2002

(54) MILK-BASED POWDER FOR PETS

(75) Inventors: Francoise Couzy, Savigny (CH); Jean-Louis Leuba, deceased, late of Boussens (CH), by Christiane A. Leuba, Frederic Leuba, Aurelie Leuba, legal representatives

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/801,264

(22) Filed: Mar. 7, 2001

(65) Prior Publication Data

US 2002/0031571 A1 Mar. 14, 2002

Related U.S. Application Data

(63) Continuation of application No. PCT/EP99/06621, filed on Sep. 7, 1999.
(60) Provisional application No. 60/099,383, filed on Sep. 8, 1998.

(51) Int. Cl.$^7$ ............................ A23K 1/165; A23K 1/18; A23C 9/00
(52) U.S. Cl. ............................ 426/2; 426/61; 426/588; 426/805
(58) Field of Search ............................ 426/2, 61, 588, 426/805

(56) References Cited

U.S. PATENT DOCUMENTS

| | | | | |
|---|---|---|---|---|
| 2,781,266 A | * | 2/1957 | Stimpson ........................ 99/9 |
| 3,816,259 A | * | 6/1974 | Collinge et al. ............... 195/62 |
| 4,007,283 A | * | 2/1977 | Crisan et al. .................. 426/34 |
| 4,853,246 A | * | 8/1989 | Stevens ....................... 426/580 |
| 4,944,952 A | * | 7/1990 | Kobayashi et al. ........... 426/42 |
| 5,141,755 A | | 8/1992 | Weisman ...................... 426/42 |

FOREIGN PATENT DOCUMENTS

| EP | 0 323 201 | * | 12/1987 |
|---|---|---|---|
| EP | 0 458 358 | * | 11/1991 |
| JP | 58201949 | | 11/1983 |

OTHER PUBLICATIONS

"Mammal Nutrition", Dierenfeld et al., http://www-.zcog.org/zcog%20frames.*
Pet Owners—A Cat Owner's Handbook http://www.ovma.org/pets/cat_handbook, Apr. 2001.*
Pet Owners—A Dog Owner's Handbook http://www.ovma.org/pets/dog_handbook, Oct. 2000.*
K–state veterinarian help pet owners http://www.mediarelations.ksu.edu, Mar. 1997.*
"Digestability and Palatability" http://www.speedyvet.com, 2001.*
"Feeding Cats" http://www.fabcats.org, 1997–2002.*
Management and Conservation of Captive Tigers Tilson et al. (eds) $2^{nd}$ edu. pp. 1–136. Minnesota Zoo, 1994.*
Feline Life Stages/Lifestyles, The Waltham Center for Pet Nutrition. 1999.*
"Milk Composition", Lactation Biology Course offered by Univ. of ILL, http://www.classes.aces.uiuc.edu.*
"The Lactose Zoo", http://ourworld.compuserve.com/homepages/stevecarper/zoo.html.*
Rao et al. "Enzyme Technologies For Alleviating Lactose Maldigestion" Food & Science Tech. Int.'l, vol. 3, No. 2, pp. 82–85 (1997).
V. H. Holsinger et al., "Applications of Lactase in Dairy Foods and Other Foods Containing Lactose", Food & Science Tech. Int.'l, vol. 3, No. 2, pp. 81–86 (1997).

* cited by examiner

*Primary Examiner*—Chhaya D. Sayala
(74) *Attorney, Agent, or Firm*—Winston & Strawn

(57) ABSTRACT

A pet milk powder which, when reconstituted and fed to a pet as a nutritional milk, results in reduced gastrointestinal intolerance. This powder is a cow's milk powder that contains lactose and to which is added a lactase, preferably one that is active under acidic conditions, such as a $\beta$-galactosidase.

10 Claims, No Drawings

MILK-BASED POWDER FOR PETS

CROSS-REFERENCE TO RELATED APPLICATIONS

This application is a continuation of the U.S. national phase designation of International application PCT/EP99/06621, filed Sep. 7, 1999, the content of which is expressly incorporated herein by reference thereto, which claims the benefit of Provisional application Ser. No. 60/099,383, filed Sep. 8, 1998.

TECHNICAL FIELD

This invention relates to a milk-based powder that may be reconstituted to provide a milk-based nutritional composition for pets and especially for young pets.

BACKGROUND ART

Many pet owners, especially owners of young pets, feed cow's milk or cow's milk based compositions to their pets since cow's milk is an excellent source of nutrition. Further, in cases where very young pets are unable to obtain milk from their mothers, cow's milk or compositions based upon cow's milk may be the only source of nutrition for the young animal.

Unfortunately, the feeding of cow's milk to pet mammals may result in gastrointestinal intolerance. This manifests itself in a variety of intestinal symptoms which include bloating, distension, cramp, flatulence, lower faecal consistency and, in severe cases, diarrhoea. Lower faecal consistency and diarrhoea are particularly well known symptoms (Mundt, H-C. and Meyer, H.; 1989, Waltham Symposium 7: Nutrition of the Dog and Cat, Cambridge University Press, pages 267–274). The cause of the gastrointestinal intolerance is attributed to the lactose in cow's milk.

Removal of lactose from cow's milk for human applications is well known. This is usually done by micro- or ultra-filtration or enzymatic treatment, or both, of liquid milk or whey solutions. Further, milk or whey powders which are low in lactose, or lactose free, are commercially available and may be fed to pets, but these powders are generally too expensive for commercial use in pet products. For pets, a possible solution to the problem is described in European patent application 0259713. Here the lactose in the composition is reduced by reducing the content of milk powder in the composition to below about 60% by weight. In order to make up for the reduction in protein, lactose-reduced or lactose-free milk proteins are then added to the composition. In this way, the lactose content of the composition may be reduced to below about 30% by weight, but this requires the addition of large amounts of lactose-reduced or lactose-free milk proteins which increases the cost.

Mundt and Meyer (supra) suggest that another solution to this problem is to hydrolyze the lactose using enzymes prior to producing the pet milk powder. This is an acceptable solution when milk is freely and inexpensively available in liquid form, but it is not a feasible solution when the milk ingredient is available in powdered form; which is commonly the case.

Therefore there is still a need for a cow's milk-based powder which may be reconstituted to provide a milk-based nutritional composition, which is relatively simple to prepare and relatively inexpensive.

SUMMARY OF THE INVENTION

Accordingly, in one aspect, this invention provides a pet milk powder comprising a cow's milk powder which contains lactose, and a lactase.

It is surprisingly found that the simple addition of lactase to milk powder is able to avoid or significantly reduce the gastrointestinal problems associated with the consumption of lactose. This is despite the fact that the milk composition produced by reconstituting the milk powder may be consumed immediately after reconstitution; that is before the lactase has had the time to degrade the lactose in the milk powder.

Preferably, the lactase is a β-galactosidase; more preferably one from micro-organism origin. A β-galactosidase which is active at an acidic pH is particularly preferred.

The milk powder may further comprise one or more of a lipid source, protein source, vitamins and minerals.

In another aspect, this invention provides a milk powder for cats, the powder comprising a cow's milk powder which contains lactose, a lactase, taurine, arginine and choline.

In a yet further aspect, this invention provides a milk powder for dogs, the powder comprising a cow's milk powder which contains lactose, a lactase, and choline.

In a further aspect, this invention provides a method for reducing the symptoms of gastrointestinal intolerance in a mammalian pet after consumption of a nutritional composition based on cow's milk, the method comprising administering to the pet an effective amount of a lactase in combination with the nutritional composition.

DETAILED DESCRIPTION OF THE PREFERRED EMBODIMENTS

Preferred embodiments of the invention are now described by way of example only.

The invention concerns a milk-based powder which may be reconstituted with water to provide a nutritional milk for pets which has reduced gastrointestinal intolerance.

The milk-based powder contains cow's milk powder and a lactase. The cow's milk powder may be any suitable milk powder which is based upon cow's milk; for example skimmed milk powder and whole milk powder. Further, milk powders produced from standardized milk-based solutions may be used. If desired, the cow's milk powder may contain additives such as vitamins, minerals, protein, lipids, and the like. The lactose content of the milk powder is not critical to the invention. Of course, if cow's milk powders having low lactose contents are readily and inexpensively available, they may be advantageously used.

The lactase may be any suitable lactase which is generally recognized as safe. β-galactosidases are preferred; especially β-galactosidases of microbial origin. Since conditions in the gastrointestinal tract are acidic, a lactase which remains active under acidic conditions is preferred. It is also possible to use lactases which are active under neutral or basic conditions. In these cases, however, it may be useful to include an alkali in the milk-based powder which slows the pH drop in the gastrointestinal tract.

An enzyme which is particularly suitable is a β-galactosidase which may be obtained from Amano Enzyme USA Co Ltd of Lombard, Ill., USA. The enzyme is available under the name "Lactase Amano". The enzyme is obtained from *Aspergillus oryzae* and has an optimum pH of about 4.8 when lactose is the substrate. The enzyme has an activity of more than 50000 units/g at optimum pH. The enzyme is generally recognized as safe and is food grade.

The amount of the lactase to be added will depend upon various factors such as the lactose content of the cow's milk powder and the activity of the enzyme. The useful amount may be readily determined by a skilled person. Ordinarily, the lactase may be added to provide about 25 UI100 g to about 200 UI/100 g powder; for example about 50 UI/100 g to about 125 UI/100 g powder. The unit, UI, indicates the amount of enzyme which produces 1 micromole of o-Nitrophenol per minute at 30° C. when 3.0 ml of a solution which contains 200 mg of o-Nitrophenol-β-galactopyranoside per 100 ml of 0.1 M McIlvaine buffer, pH 4.5; is added to 1.0 ml of diluted enzyme solution. The reaction is stopped after 10 minutes.

For an enzyme which has an activity of about 50 UI/100 g to about 125 UI/100 g powder, the lactase may comprise about 0.05% to about 0.4% by weight of the milk-based powder; and preferable from about 0.15% to about 0.25% by weight.

If it is desired to make the milk-based powder more nutritionally complete, other nutritional components may be added to the powder. For example, a lipid source may be added to the milk-based powder. Any suitable lipid source may be used; for example vegetable oils such as soybean oil, sunflower oil, safflower oil, corn oil, peanut oil, and rapeseed oil, or animal fats such as milk fats and tallow. In general, the lipid source used will be selected on the basis of nutritional value, cost and palatability considerations.

It is also possible to add further protein and amino acids sources. For example, whey protein powders may be added to the milk-based powder. Similarly, the milk-based powder may be supplemented with free amino acids which are required by the mammal for complete nutrition. For example, for milk-based powder intended for kittens, the powder may be supplemented with taurine or arginine, or both.

The milk-based powder may also contain vitamins and minerals. It is particularly preferred to include a source of calcium; for example dicalcium phosphate.

The milk-based powder may also include a probiotic micro-organism. A probiotic micro-organism is a micro-organism which beneficially affects a host by improving its intestinal microbial balance (Fuller, R; 1989; *J. Applied Bacteriology*, 66: 365–378). In general, probiotic micro-organisms produce organic acids such as lactic acid and acetic acid which inhibit the growth of pathogenic bacteria. Examples of suitable probiotic micro-organisms include yeasts such as *Saccharomyces, Debaromyces, Candida, Pichia* and *Torulopsis*, moulds such as *Aspergillus, Rhizopus, Mucor,* and *Penicillium* and *Torulopsis* and bacteria such as the genera *Bifidobacterium, Bacteroides, Clostridium, Fusobacterium, Melissococcus, Propionibacterium, Streptococcus, Enterococcus, Lactococcus, Staphylococcus, Peptostrepococcus, Bacillus, Pediococcus, Micrococcus, Leuconostoc, Weissella, Aerococcus, Oenococcus* and *Lactobacillus*. Specific examples of suitable probiotic micro-organisms are: *Saccharomyces cereviseae, Bacillus coagulans, Bacillus licheniformis, Bacillus subtilis, Bifidobacterium bifidum, Bifidobacterium infantis, Bifidobacterium longum, Enterococcus faecium, Enterococcus faecalis, Lactobacillus acidophilus, Lactobacillus alimentarius, Lactobacillus casei* subsp. *casei, Lactobacillus casei Shirota, Lactobacillus curvatus, Lactobacillus delbruckii* subsp. *lactis, Lactobacillus farciminus, Lactobacillus gasseri, Lactobacillus helveticus, Lactobacillus johnsonii, Lactobacillus reuteri, Lactobacillus rhamnosus* (Lactobacillus GG), *Lactobacillus sake, Lactococcus lactis, Micrococcus varians, Pediococcus acidilactici, Pediococcus pentosaceus, Pediococcus acidilactici, Pediococcus halophilus, Streptococcus faecalis, Streptococcus thermophilus, Staphylococcus carnosus,* and *Staphylococcus xylosus*. The probiotic micro-organisms are preferably in powdered, dried form; especially in spore form for micro-organisms which form spores. Further, if desired, the probiotic micro-organism may be encapsulated to further increase the probability of survival; for example in a sugar matrix, fat matrix or polysaccharide matrix.

Further, the milk-based powder may also include a source of a fermentable soluble fiber, for example, chicory fibers, inulin, fructooligosaccharides, and the like. Preferably the fermentable soluble fibre selected is a substrate for the probiotic micro-organism selected, or such that the fermentable soluble fiber and probiotic micro-organism form a symbiotic relationship for promoting beneficial effects.

It is of course possible that vitamins, minerals, amino acids and a lipid source may have been used in the preparation of the cow's milk powder. In this case, less or none of these ingredients need be added.

The milk-based powder may be manufactured by dry mixing the cow's milk powder, the lactase, and any other ingredients. If a lipid source is added, it is preferably mixed in last. Any suitable mixing apparatus may be used. The milk-based powder is then packed into suitable packages.

The amount of the nutritional composition to be fed to a mammal each day will depend upon factors such as the mammal's age, the type of mammal, and other sources of nutrition. In general, the nutritional composition may be used in much the same way and in the same amounts as milk is used. For example, for medium and large dogs, up to about 250 ml of the nutritional composition per day may be fed to the dog. For smaller dogs, up to about 125 ml of the nutritional composition per day may be fed to the dog. Similar values may be readily determined for cats and other mammals.

EXAMPLES

By way of illustration, specific examples of the invention are now described.

Example 1

A milk-based powder for dogs is prepared by dry mixing together whole milk powder, β-galactosidase ("Lactase Amano"), vitamins, minerals and soybean oil. The composition of the powder is as follows:

| Ingredient | Percent by Weight |
| --- | --- |
| Milk powder | 96.2 |
| Soybean oil | 1.7 |
| Dicalcium phosphate | 1.1 |
| Choline | 0.4 |
| β-galactosidase | 0.2 |
| Vitamins, Minerals | 0.4 |

The milk-based powder has a lactose content of about 33% by weight. The milk powder is added to tap water and is rapidly reconstituted to provide a milk-based nutritional composition. The nutritional composition is highly palatable to puppies and dogs.

Example 2

A milk-based powder for cats is prepared by dry mixing together whole milk powder, β-galactosidase, arginine, taurine, vitamins, minerals and soybean oil. The composition of the powder is as follows:

| Ingredient | Percent by Weight |
|---|---|
| Milk powder | 97.1 |
| Dicalcium phosphate | 1.5 |
| Choline | 0.4 |
| Arginine | 0.4 |
| β-galactosidase | 0.2 |
| Soybean oil | 0.05 |
| Vitamins, Minerals | 0.35 |

The milk-based powder has a lactose content of about 33% by weight. The milk powder is added to tap water and is rapidly reconstituted to provide a milk-based nutritional composition. The nutritional composition is highly palatable to kittens and cats.

Example 3

Seven beagle dogs 5 to 12 years are used in a trial. Each dog is separately housed in a cage. The dogs have access to a dry diet *ad libitum*.

In the first part of the trial, the dogs are fed a milk reconstituted from a full fat milk powder for a period of 7 days. The milk contains vitamins and minerals. The milk is reconstituted immediately before serving by adding cold tap water to the fill fat milk powder. Food consumption, liquid consumption and faecal consistency are monitored.

In the second part of the trial, the dogs are fed a nutrition composition reconstituted from the milk-based powder of example 1 for a period of 7 days. The nutrition composition is reconstituted immediately before serving by adding cold tap water to the milk-based powder. Food consumption, liquid consumption and faecal consistency are monitored.

In both parts of the trial, each dog is fed 900 g per day of the milk or nutritional composition. The milk or nutritional composition is available from 9 a.m. to 3 p.m. and is the only liquid source during this period. In general, the entire amount of liquid is consumed rapidly. From 3 p.m. to 9 a.m., the dogs have free access to water.

| Food | Percentage of stool having loose stool consistency | Percentage of stools being diarrhoeic |
|---|---|---|
| Milk | 36 | 19 |
| nutritional composition of example 1 | 12 | 7 |

The nutritional composition offers a significant improvement even at this high level of consumption.

Example 4

Seven cats aged 5 to 12 years are used in a trial. Each cat is separately housed in a cage. The cats have access to a fish-based dry diet *ad libitum*.

In the first part of the trial, the cats are fed a milk reconstituted from a full fat milk powder for a period of 7 days. The milk contains vitamins and minerals. The milk is reconstituted immediately before serving by adding cold tap water to the full fat milk powder. Food consumption, liquid consumption and faecal consistency are monitored.

In the second part of the trial, the cats are fed a nutrition composition reconstituted from the milk-based powder of example 2 for a period of 7 days. The nutrition composition is reconstituted immediately before serving by adding cold tap water to the milk-based powder. Food consumption, liquid consumption and faecal consistency are monitored.

In both parts of the trial, each cat is presented with 180 g per day of the milk or nutritional composition. The milk or nutritional composition is available from 3:00 p.m. to 9 a.m. and is the only liquid source during this period. From 9 a.m. to 3 p.m., the cats have free access to water.

| Food | Percentage of stool having loose stool consistency | Percentage of stools being diarrhoeic |
|---|---|---|
| Milk | 42 | 37 |
| nutritional composition of example 2 | 20 | 0 |

The nutritional composition offers a very significant improvement. No significant change in consumption between the milk and nutritional composition is noticed. Hence palatability is unaffected by the addition of the enzyme.

Example 5

A milk-based powder is prepared using a β-galactosidase enzyme obtained from Novo Nordisk A/S of Bagsvaerd, Denmark and sold under the name Lactozym. The powder is substantially identical to the powder of example 1 except that this different enzyme is used. The enzyme is optimally active under basic conditions.

When fed to beagle dogs, the milk-based powder has substantially the same properties as the powder of example 1.

What is claimed is:

1. A method for reducing the symptoms of gastrointestinal intolerance in pets who ingest a reconstituted pet milk powder comprising a cow's milk containing lactose, which method comprises administering to the pet a lactase in an amount sufficient to reduce symptoms of gastrointestinal intolerance in the pet, wherein the lactase is administered as an ingredient of the pet milk composition that is to be reconstituted.

2. The method according to claim 1 in which the lactase is present in the pet milk powder in an amount of between about 0.05 to 0.4% by weight of the powder.

3. The method according to claim 1 in which the lactase is one that has optimum activity under acidic conditions.

4. The method according to claim 1 in which the lactase is a β-galactosidase.

5. The method according to claim 4 in which β-galactosidase is of microbial origin.

6. The method according to claim 1 in which the lactase provides about 75 UI/100g to about 125 UI/100g of powder.

7. The method according to claim 1 which further comprises at least one of a lipid source, a protein source, one or more vitamins or one or more minerals.

8. The method according to claim 1 which further comprises a calcium source.

9. The method of claim 1 specifically formulated for cats, the powder containing taurine and choline.

10. The method of claim 1 specifically formulated for dogs, the powder containing choline.

* * * * *

UNITED STATES PATENT AND TRADEMARK OFFICE
CERTIFICATE OF CORRECTION

PATENT NO.    : 6,471,999 B2
DATED         : October 29, 2002
INVENTOR(S)   : Couzy et al.

It is certified that error appears in the above-identified patent and that said Letters Patent is hereby corrected as shown below:

<u>Title page,</u>
Item [75], Inventors, change "Francoise Couzy, Savigny (CH)" to -- Francois Couzy, La Croix sur Lutry (CH) --.
Item [56], References Cited, OTHER PUBLICATIONS, change "al. (eds) $2^{nd}$ edu." to -- al. (eds) $2^{nd}$ edn. --.

Signed and Sealed this

Twenty-eighth Day of January, 2003

JAMES E. ROGAN
*Director of the United States Patent and Trademark Office*